United States Patent [19]

Griffin

[11] Patent Number: 4,579,488
[45] Date of Patent: Apr. 1, 1986

[54] BORING BAR ASSEMBLY

[76] Inventor: James W. Griffin, 17133 Imperial Valley Dr., Apt. 71, Houston, Tex. 77060

[21] Appl. No.: 581,885

[22] Filed: Feb. 21, 1984

[51] Int. Cl.$^4$ .............................................. B23B 25/03
[52] U.S. Cl. ...................................... 409/136; 408/59; 408/710
[58] Field of Search .................... 408/57, 59, 181, 199, 408/186, 238, 710; 409/136, 144

[56] References Cited

U.S. PATENT DOCUMENTS 4,072,438  2/1978  Powers .................................. 408/59
4,228,705 10/1980  Heisner ........................... 408/199 X

FOREIGN PATENT DOCUMENTS 748147  12/1966  Canada .................................. 408/59
2813575 10/1978  Fed. Rep. of Germany ...... 408/181

Primary Examiner—Eugene F. Desmond
Attorney, Agent, or Firm—Neal J. Mosely

[57] ABSTRACT

A boring bar assembly comprises a shank portion and a detachable head portion supported thereon for rotary movement. The head portion may carry one or more removable cutting tool inserts for machining. The head portion is pinned in a fixed position on the shank portion by a shear pin. Excessive pressure in machining causes the pin to shear and allows the head portion to rotate on the shank portion and move away from the surface being machined, thus reducing tool breakage and damage to the parts being machined. An axially offset fluid passageway extends longitudinally through both the shank and head portions to direct liquid coolant onto the cutting tool surface. The axial offset of the passageway does not weaken the boring bar in flexure as much as an axial passageway.

12 Claims, 7 Drawing Figures

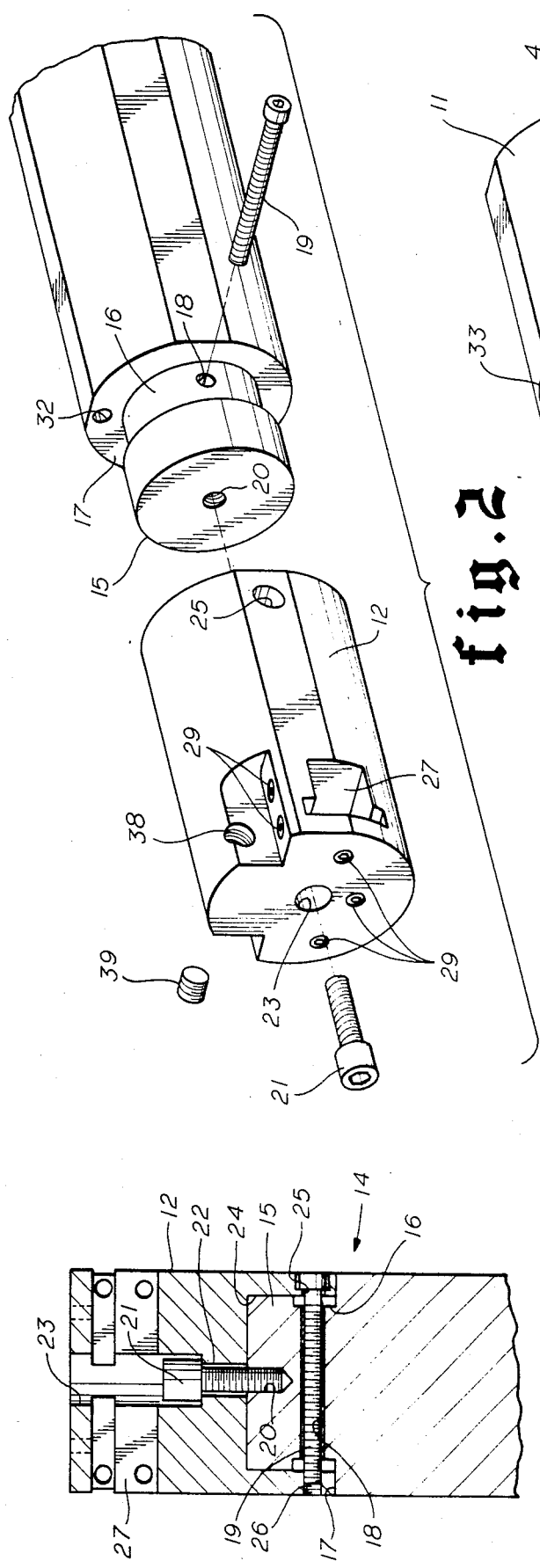
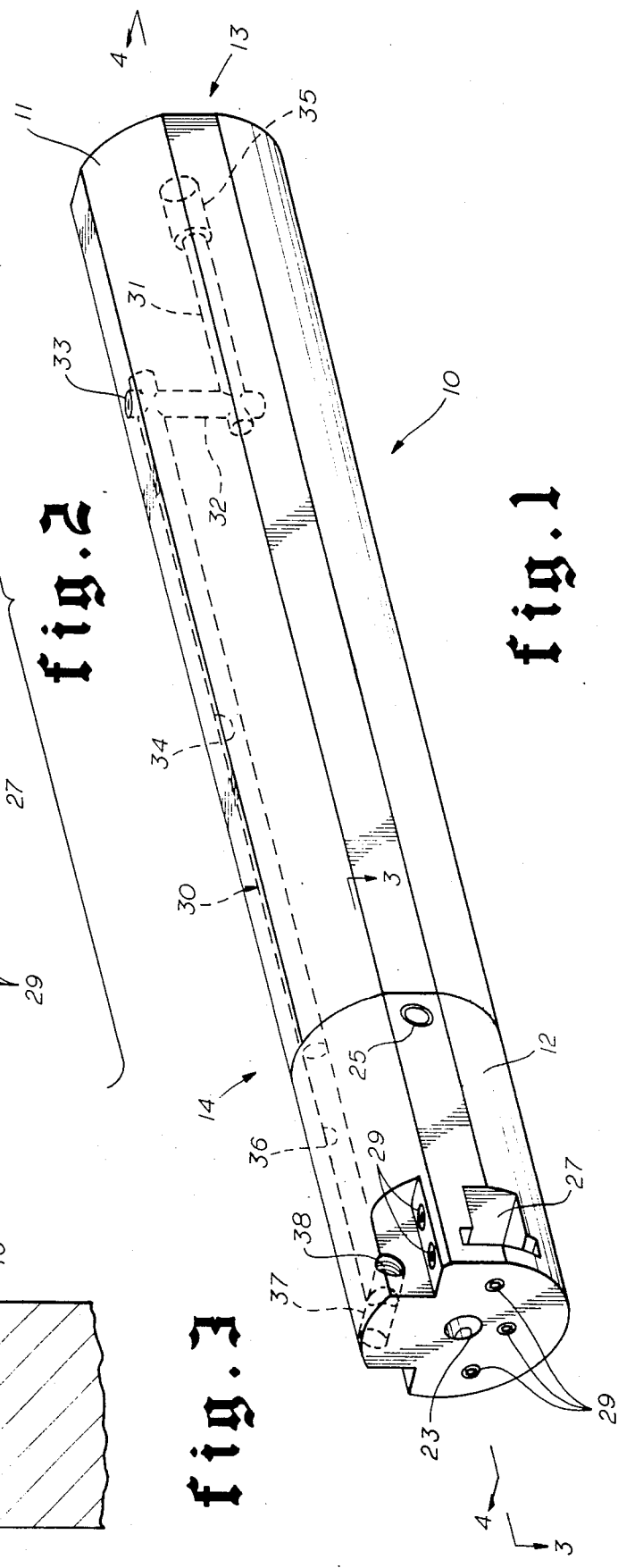

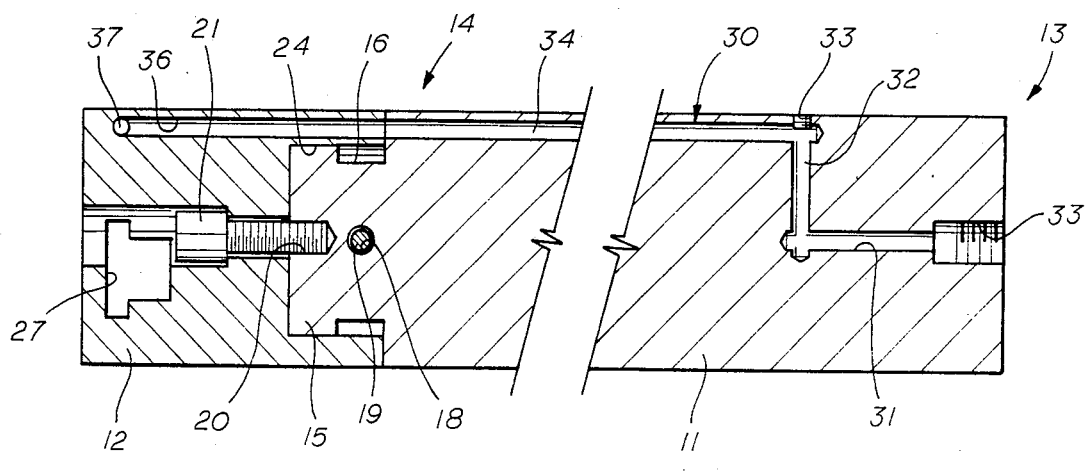
fig.4
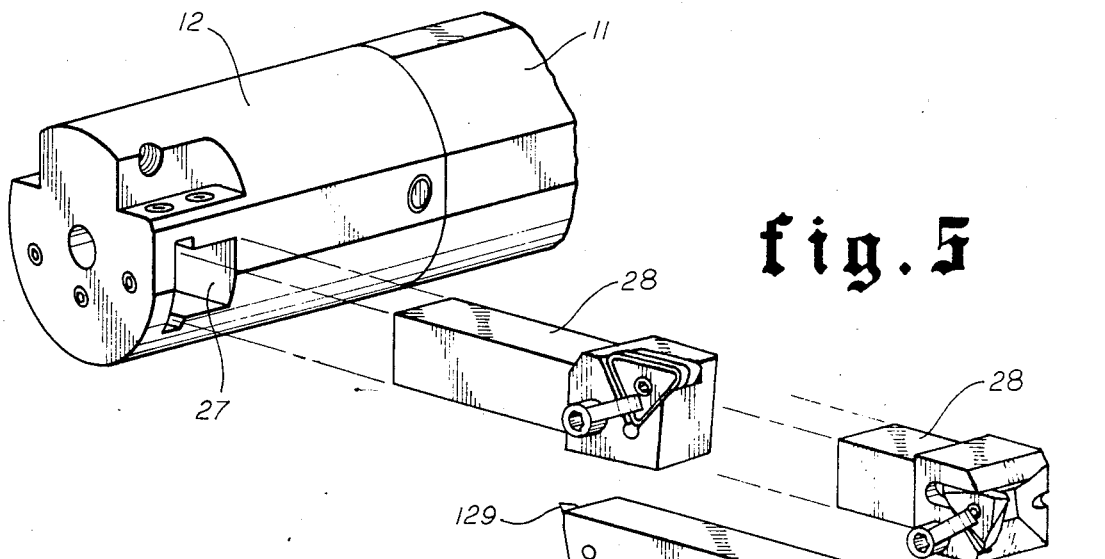
fig.5
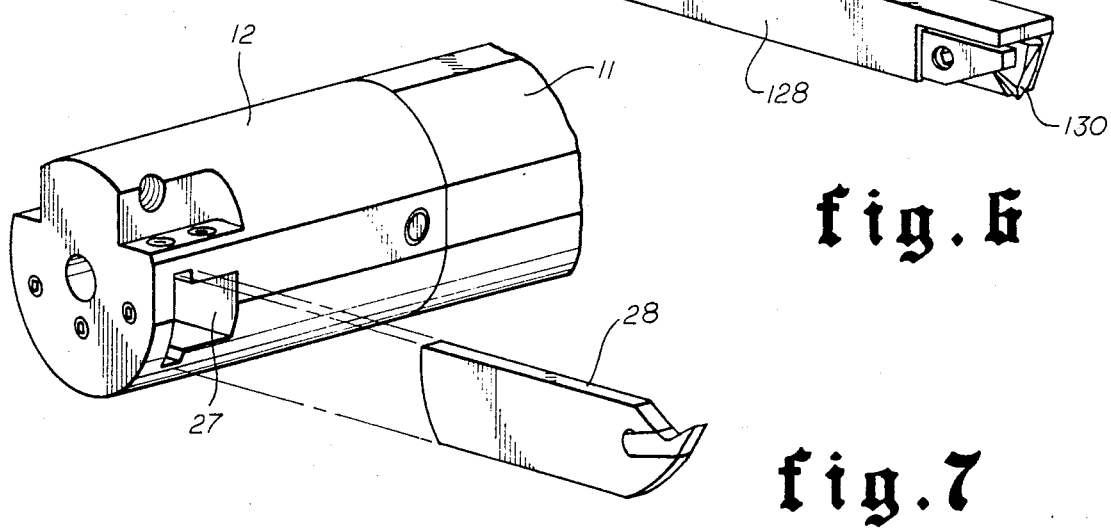
fig.6
fig.7

BORING BAR ASSEMBLY

BACKGROUND OF THE INVENTION

1. Field of the Invention

This invention relates to boring bars for supporting machine tools, and more particularly to a boring bar assembly providing for cooling a tool during cutting and constructed for safety in operation and reduction of cutting tool breakage and damage to the parts being machined.

2. Brief Description of the Prior Art

In the machining of metal pieces with boring bars, it is important to be able to replace cutting tool inserts quickly and efficiently with a minimum amount of time lost in the repositioning and realignment operation. It is also very important to reduce the amount of tool breakage and the amount of material scrapped or destroyed by the cutting tool becoming dull or by the tool digging into the workpiece.

There are several patents which disclose boring bars and boring bar assemblies.

Jones, U.S. Pat. No. 2,333,935 discloses a cutting bar assembly for cutting internal grooves.

Johnson, U.S. Pat. No. 2,520,639 discloses another grooving tool having a rotary head portion.

Cogsdill, U.S. Pat. No. 3,195,378 discloses another boring tool.

Vassalo, U.S. Pat. No. 3,298,254 discloses a boring or grooving tool with replaceable cutters.

Proska, U.S. Pat. No. 3,344,690 discloses a boring bar assembly which comprises a shank piece and a head piece joined thereon. A telescoping tapered joint provides accurate centering of the head piece on the shank piece and manual removal of the head piece from the shank piece.

Lutz, U.S. Pat. No. 3,381,553 discloses an adjustable boring bar having a slot at one end and an adjustment means carried by the bar within the slot to flex the tip of the cutting element for radial adjustment.

Barkley, U.S. Pat. No. 4,063,843 discloses an adjustable boring bar assembly having first and second members telescopically engaged in a non-rotatable relation from one to the other. An adjustable abutment means is mounted on one of the members which when rotated provides relative axial movement between the first and second members.

Lovendahl, U.S. Pat. No. 4,164,381 discloses a boring bar assembly with an externally mounted cutting assembly.

Heaton et al, U.S. Pat. No. 4,197,771 discloses a quick change device for mounting a cutting tool in a support member. The tool has a shank with radially outward movable balls therein and includes an actuator ball causing the aforementioned balls to move outwardly and engage a shoulder at the end of a sleeve to pull and lock the tool into a predetermined axial position while cooperating key means in the tool and support member prevent rotation of the tool in the support member.

Eysel et al, U.S. Pat. No. 4,224,846 discloses a boring bar assembly comprising a tool support member which may carry one or more flexible cutting tools. The cutting tools may be expanded radially outward by a set of hydraulically operated pistons.

Eckle et al, U.S. Pat. No. 4,306,473 discloses a tool insert for a boring bar comprising a housing which can be inserted in a recess on a boring bar and which has a cutting tip slidably mounted in a longitudinal bore.

The prior art in general, and none of these patents in particular, disclose a boring bar assembly providing for cooling a tool during cutting and constructed for safety in operation and reduction of cutting tool breakage and damage to the parts being machined.

SUMMARY OF THE INVENTION

It is one object of this invention to provide a boring bar assembly providing for cooling a tool during cutting and constructed for safety in operation and reduction of cutting tool breakage and damage to the parts being machined.

Another object of the invention is to provide a boring bar assembly wherein the boring bar assembly having a shank portion and a replaceable head portion which carries one or more cutting tools.

Another object of this invention is to provide a boring bar assembly having a detachable head portion which is normally non-rotatable but which will rotate relative to a fixed shank portion upon exceeding a predetermined torsional load to prevent damage to the surface being machined.

Another object of this invention is to provide a boring bar assembly having a detachable head portion which is normally pinned by a shear pin in a non-rotatable position but which will rotate relative to a fixed shank portion upon exceeding a predetermined torsional load and shearing the shear pin, thus preventing damage to the surface being machined and reducing tool breakage.

Another object of this invention is to provide a boring bar assembly having an axially offset fluid passage extending longitudinally therethrough to direct a liquid coolant onto the surface of a cutting tool member to prevent tool chatter and overheating.

Other objects of the invention will become apparent from time to time throughout the specification and claims as hereinafter related.

The above noted objects and other objects of the invention are accomplished by a boring bar assembly comprising a shank portion and a detachable tool holder head portion rotatable mounted thereon and pinned by a shear pin in a normally fixed position and which has an axially offset fluid passage extending longitudinally through both portions to direct coolant onto the cutting tool surface.

BRIEF DESCRIPTION OF THE DRAWINGS

FIG. 1 is an isometric view of a boring bar assembly illustrating a preferred embodiment of the invention.

FIG. 2 is a partial, exploded, isometric view of the boring bar assembly.

FIG. 3 is a partial, horizontal, cross-sectional view taken along line 3—3 of FIG. 1.

FIG. 4 is a vertical cross-sectional view taken along line 4—4 of FIG. 1.

FIG. 5 is a partial, exploded, isometric view of the boring bar assembly illustrating the use of one cutting tool insert.

FIG. 6 is an isometric view of a two-ended cutting tool insert for use with the boring bar assembly.

FIG. 7 is a partial, exploded, isometric view of the boring bar assembly illustrating the use of another cutting tool insert.

DESCRIPTION OF THE PREFERRED EMBODIMENT

Referring to the drawings by numerals of reference, there is shown a preferred boring bar assembly 10 which is generally elongated and rod-like in shape and having a shank portion 11 and a detachable head portion 12. The rearward end 13 of the shank portion 11 is adapted to be secured in conventional metal working machines which utilize boring bars such as C.N.C. lathes, vertical turret lathes, and the like.

The forward end 14 of shank portion 11 has a longitudinally extending neck portion 15 of reduced diameter. Neck portion 15 has a circumferntial groove 16 defining a radial shoulder 17. The groove 16 has a bore or passage 18 extending diametrically of shank portion 11 to receive a shear pin 19. The forward end of neck portion 15 has a central threaded bore 20 extending rearwardly a short distance along the longitudinal axis of the shank portion 11 to receive a cap screw 21.

The forward end of the head portion 12 has a central bore 22 (FIG. 3) and counterbore 23 (FIGS. 1–3) extending rearwardly along the longitudinal axis thereof to receive cap screw 21. A central counterbore 24 extends forward from the rear end of the head portion 12 and is sized to receive the neck portion 15 of the shank member 11 for rotary movement thereon. A diametrically transverse bore 25 is located near the rear end of head portion 12 for axial alignment with bore 18 and has threads 26 at one end to receive the shear pin 19.

Head portion 12 has a slot 27 perpendicular to its longitudinal axis and for receiving one or more conventional cutting tool inserts 28 (FIGS. 5 and 7). Conventional set screws 29 are provided for releasably securing the inserts 28 in the slot 27. The cutting inserts may extend laterally from either side of the head 12. The detachable head 12 may be configured to accept various types of metal working tool inserts to be used with the boring bar assembly such as boring tools, cut-off tools, threading tools, and forming tools. FIGS. 5 and 7 show some typical types of inserts. FIG. 6 shows a cutting tool insert 128 having cutters 129 and 130 at opposite ends. This insert can be used for different machining operations without the need for changing the inserts.

A fluid passageway 30 extends longitudinally through the shank portion 11 and head portion 12 parallel to and axially offset from the longitudinal axes thereof for conducting a liquid coolant to the cutting tool surfaces. Passageway 30 comprises passages 31, 32, 34, 36 and 37, described more fully below. Passage 31 is a small diameter passage extending axially inwardly a short distance from the rear end 13 of the shank portion 11 which communicates with a radial passage 32 of the same diameter extending downwardly from the outer surface of the shank 11. The outer end of radial passage 32 has a suitable closure such as a plug 33 or by welding.

A longer longitudinal passage 34 having the same diameter as the radial passage 32 extends rearwardly from shoulder 17 and is radially offset from the longitudinal axis of shank portion 11. The rear end 13 of the shank portion 11 has a central threaded counterbore 35 opening from bore 31 for connecting passageway 30 to a liquid coolant source.

Head portion 12 has a radially offset longitudinal passage 36 extending from its rear end and ending just before the forward end. A transverse passage 37 of the same diameter extends from longitudinal passage 37 and the outer surface of the head portion 12 on opposite sides thereof. The outer ends of the transverse passage 37 are provided with threads 38 to receive one or more sealing plugs 39. The transverse passage 37 is located above and generally parallel to transverse slot 27 for directing liquid coolant onto the cutting surface(s) of the tool insert(s). When two cutting tool inserts are used, passage 37 is left open on both ends for supply of coolant to both tools. One end of passage 37 may be plugged by plug 39 when only one tool insert is being used.

OPERATION

The appropriate shank portion 11, head portion 12, and cutting tool insert 28 are selected for the desired machining operation. Head portion 12 is inserted onto the extended neck portion 15 of the shank portion 11 and secured in place with the cap screw 21. The head portion 12 is rotated until the passage 25 is aligned with the passage 18, and secured against rotational movement by installing the shear pin 19. In this position, passages 34 and 36 are aligned for supply coolant fluid through passageway 30 to the cutting tools. Boring bar assembly 10 is then installed in the appropriate lathe or other metal working machine.

The boring bar assembly 10 can work on inside or outside diameters, and may carry one or two cutting tool inserts or the double ended cutter insert 128. The coolant supply is activated and the machining operation begins. The coolant travels through passageway 30 in boring bar assembly 10 and is directed onto the cutting tool surface(s) to cool and reduce tool chatter.

When the cutting tool becomes dull or the boring bar assembly 10 is otherwise subjected to an excessive torsional load, the shear pin 19 will shear and the head portion 12, retained in place by cap screw 21, will rotate on neck portion 15 to allow the cutting tool to move away from the surface being machined and prevent damage to the surface or breakage of the tool. Replacement of the shear pin 19, and exchange of tool inserts or of the head portion 12 may be done while the shank portion 11 remains in the machine.

While this invention has been described fully and completely with special emphasis upon a preferred embodiment, it should be understood that within the scope of the appended claims the invention may be practiced otherwise than as specifically described herein.

I claim:
1. A boring bar assembly comprising
   a two-piece, generally rod-like member comprising a rod-like shank portion having one end adapted to be received in a boring machine and a head portion mounted for rotation thereon but initially secured in a fixed position by releaseable means,
   said head portion including means to receive and adjustably support one or more metal working tools,
   said shank portion having an axially centered fluid passageway at said one end portion thereof,
   an axially offset fluid passageway connected to said axially centered passageway extending longitudinally through said shank and head portions and having openings through said head portion to direct liquid coolant selectively to either side of said tool onto the metal working tool surfaces, and
   means responsive to a predetermined torsional overload on said head portion to release the same for rotary movement on said shank portion.

2. A boring bar assembly according to claim 1 in which
said releasing means comprises a shear pin.

3. A boring bar assembly according to claim 1 in which
said shank portion and said head portion have mating opposing ends slidably and rotatably engaged, said releasable securing means preventing longitudinal disengagement of said shank and head portions, and
said releasing means holding said shank portion and said head portion in non-rotatable position relative to each other but allowing said portions to rotate relative to each other in response to a predetermined torsional load.

4. A boring bar assembly according to claim 3 in which
said holding means comprises a shear pin.

5. A boring bar assembly according to claim 3 in which
said releasable securing means comprises a cap screw,
said shank portion has a longitudinally extending neck portion of reduced diameter having a central threaded passage to receive said cap screw, and
said head portion has a central bore and counterbore extending rearward along its longitudinal axis to receive said cap screw therein.

6. A boring bar assembly according to claim 3 in which
said head portion has a central bore extending into the rear end thereof receiving said shank member neck portion for rotary movement thereon.

7. A boring bar assembly according to claim 3 in which
said head portion has a central bore extending into the rear end thereof receiving said shank member neck portion for rotary movement thereon,
said releasable securing means comprises a cap screw,
said shank portion has a longitudinally extending neck portion of reduced diameter having a central threaded passage to receive said cap screw, and
said head portion has a central bore and counterbore extending rearward along its longitudinal axis to receive said cap screw therein.

8. A boring bar assembly according to claim 1 in which
said head portion has a transverse slot perpendicular to its longitudinal axis adapted to receive at least one laterally extending cutting tool insert.

9. A boring bar assembly according to claim 1 in which
said axially centered passageway comprises a small diameter passage extending longitudinally forward a short distance from the rear end of said shank portion,
said axially offset passageway comprising a radially offset first longitudinal passage extending to the forward end of said shank portion and a second longitudinal passage in said head portion in axial mating alignment with said first longitudinal passage in said shank portion and extending from the rear end thereof and ending just before the forward end of said head portion,
a first transverse passageway extending radially outward from the forward end of said axially centered passageway to the rearward end of said first longitudinal passage,
a second transverse passage extending laterally from said forward end of said second longitudinal passage to opposite sides of said head portion,
means for selectively sealing either outer end of said transverse passage,
said outer ends of said transverse passage positioned adjacent to metal working tools head therein to direct liquid coolant onto the cutting surface of said tools, and means in said shank portion for connecting said passageway to a liquid coolant source.

10. A boring bar assembly according to claim 1 in which
said shank portion has a longitudinally extending neck portion of reduced diameter,
said head portion has a central bore extending into the rear end thereof receiving said shank member neck portion for rotary movement thereon,
said releasable securing means comprises a cap screw,
said shank neck portion having a central threaded passage to receive said cap screw, and
said head portion having a central bore and counterbore extending rearward along its longitudinal axis to receive said cap screw therein,
said head portion having a transverse slot perpendicular to its longitudinal axis adapted to receive at least one laterally extending cutting tool insert,
said coolant passageway comprises
said axially centered passageway comprises a small diameter passage extending longitudinally forward a short distance from the rear end of said shank portion,
said axially offset passageway comprising a radially offset first longitudinal passage extending to the forward end of said shank portion and a second longitudinal passage in said head portion in axial mating alignment with said first longitudinal passage in said shank portion and extending from the rear end thereof and ending just before the forward end of said head portion,
a first transverse passageway extending radially outward from the forward end of said axially centered passageway to the rearward end of said first longitudinal passage,
a second transverse passage extending laterally from said forward end of said second longitudinal passage to opposite sides of said head portion,
means for selectively sealing either outer end of said transverse passage,
said outer ends of said transverse passage positioned adjacent to said tool holding slot to direct liquid coolant onto the cutting surface of tools positioned therein, and
said shank portion having a threaded opening for connecting said coolant passageway to a liquid coolant source.

11. A boring bar assembly according to claim 1 in which
said shank portion has a longitudinally extending neck portion of reduced diameter,
said head portion has a central bore extending into the rear end thereof receiving said shank member neck portion for rotary movement thereon,
said releasing means comprising a shear pin extending through portions of said head portion and said shank neck portion and threadedly secured therein,
said releasable securing means comprises a cap screw, said shank neck portion having a central threaded passage to receive said cap screw, and said head portion having a central bore and counterbore extending rearward along its longitudinal axis to receive said cap screw therein, said head portion having a transverse slot perpendicular to its longitudinal axis adapted to receive at least one laterally extending cutting tool insert, said coolant passageway comprises said axially centered passageway comprises a small diameter passage extending longitudinally forward a short distance from the rear end of said shank portion, said axially offset passageway comprising a radially offset first longitudinal passage extending to the forward end of said shank portion and a second longitudinal passage in said head portion in axial mating alignment with said first longitudinal passage in said shank portion and extending from the rear end thereof and ending just before the forward end of said head portion, a frist transverse passageway extending radially outward from the forward end of said axially centered passageway to the rearward end of said first longitudinal passage, a second transverse passage extending laterally from said forward end of said second longitudinal passage to opposite sides of said head portion, means for selectively sealing either outer end of said transverse passage, said outer ends of said transverse passage positioned adjacent to said tool holding slot to direct liquid coolant onto the cutting surface of tools positioned therein, and said shank portion haing a threaded opening for connecting said coolant passageway to a liquid coolant source.

12. A boring bar assembly according to claim 1 including a cutting tool insert having different cutters at opposite ends thereof and secured in said head portion tool supporting means.

* * * * *